(12) United States Patent
Furukawa

(10) Patent No.: US 6,949,705 B2
(45) Date of Patent: Sep. 27, 2005

(54) AUDIO SYSTEM FOR REPRODUCING PLURAL PARTS OF MUSIC IN PERFECT ENSEMBLE

(75) Inventor: Rei Furukawa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 25 days.

(21) Appl. No.: 10/385,932

(22) Filed: Mar. 11, 2003

(65) Prior Publication Data

US 2003/0177890 A1 Sep. 25, 2003

(30) Foreign Application Priority Data

Mar. 25, 2002 (JP) .................................... 2002-083859

(51) Int. Cl.[7] .............................. G10H 1/36; G10H 7/00
(52) U.S. Cl. .......................................... 84/610; 84/645
(58) Field of Search ..................... 84/645, 600, 609, 84/610, 2–5

(56) References Cited

U.S. PATENT DOCUMENTS

| | | | |
|---|---|---|---|
| 5,402,499 A | 3/1995 | Robison et al. | |
| 5,569,869 A | 10/1996 | Sone | |
| 5,974,387 A | 10/1999 | Kageyama et al. | |
| 6,600,097 B2 | * 7/2003 | Shiiya | .......................... 84/609 |
| 6,737,571 B2 | * 5/2004 | Furukawa | ..................... 84/610 |
| 2001/0007220 A1 | 7/2001 | Koseki | |

FOREIGN PATENT DOCUMENTS

EP          1 103 973        5/2001

* cited by examiner

*Primary Examiner*—Jeffrey W Donels
(74) *Attorney, Agent, or Firm*—Morrison & Foerster LLP

(57) ABSTRACT

An ensemble controller records a performance on a MIDI musical instrument in a data field of a MIDI file synchronously with playback of a piece of music stored in a compact disc player, and the data read-out speed is stored in the control data field of the MIDI file together with an audio identification code assigned to the piece of music reproduced; when the performance is reproduced synchronously with the playback of the compact disc player, the ensemble controller adjusts a clock signal to a frequency corresponding to the data read-out speed; while the ensemble controller is making the composite apparatus reproduce the ensemble, the magnetic disc driver clocks the time intervals between the data transmission of event codes by using the clock signal of the same frequency; this results in the perfect ensemble.

22 Claims, 4 Drawing Sheets

AUDIO SYSTEM FOR REPRODUCING PLURAL PARTS OF MUSIC IN PERFECT ENSEMBLE

FIELD OF THE INVENTION

This invention relates to an audio system and, more particularly, to an audio recording/playback system for ensemble.

DESCRIPTION OF THE RELATED ART

Compact discs are popular to music lovers. Pieces of music are recorded in the compact discs, and are reproduced through a compact disc player. While a musician was playing the piece of music, the tones were converted to an analog audio signal, and discrete values were sampled from the analog audio signal. The discrete values were converted to binary values, and the binary values are stored in the compact disc in the form of digital codes together with control data codes representative of the lapse of time from the initiation of the performance. In the following description, the digital codes representative of the discrete values and control data codes representative of the lapse of time are referred to as "audio data codes" and "time data codes", respectively, and term "audio music data codes" is indicative of both of the audio data codes and the time data codes. Sets of audio data codes are stored in other sorts of information storage medium such as, for example, optical discs and magnetic discs.

Another sort of digital data codes popular to the music lowers is MIDI (Musical Instrument Digital Interface) music data codes. The MIDI music data codes are formatted on the basis of the MIDI standards, and event codes and duration data codes are typical examples of the MIDI music data codes. The event codes mainly represent note events, i. e., note-on events and note-off events. A tone is generated in the note-on event, and the tone is decayed in the note-off event. The other event codes represent other sorts of events such as, for example, the end of a performance and effects to be imparted to the tones. The duration data code is indicative of the time interval between the note events. Thus, the duration data codes are produced on the basis of the definition different from that of the time data codes. A set of MIDI music data codes represents a piece of music, and the piece of music is reproduced through MIDI musical instruments.

The compact disc players are sold in the market, and the pieces of music are reproduced from the audio music data codes stored in the compact discs. Similarly, various sorts of musical instruments are sold in the market, and the pieces of music are reproduced from the MIDI music data codes stored in floppy discs through these musical instruments. However, the compact disc player can not reproduce the pieces of music represented by the MIDI music data codes, and the user can not use the floppy discs, in which the MIDI music data codes are stored, in the playback of the pieces of music. In this situation, even if a part of a piece of music is recorded in a compact disc in the form of audio music data codes and another part of the piece of music is recorded in a floppy disc in the form of MIDI music data codes, it is difficult to reproduce the plural parts of the piece of music through the compact disc player and the MIDI musical instrument in ensemble.

One of the problems is how to process the compact disc data codes and MIDI music data codes synchronously. As described hereinbefore, the time data codes represent the lapse of time from the initiation of the performance. On the other hand, each duration data code represents a time interval between the note events. The time at which tones are generated is differently controlled between a part of a piece of and another part of the piece of music. If a user wishes to reproduce the piece of music in ensemble, either time data codes or duration data codes are to be converted to the duration data codes or time data codes. However, the compact disc players presently sold in the market neither have any signal output port from which the time data codes are output to the outside nor any signal input port for receiving the duration data codes. Moreover, the compact disc player and MIDI musical instrument do not have any software for controlling the recording and playback on the basis of the other sort of time data.

In these circumstances, it is impossible to reproduce a part of a piece of music through the MIDI musical instrument in ensemble with another part of the piece of music reproduced through the compact disc player. When the user wishes to record his performance on the MIDI musical instrument in ensemble with the piece of music reproduced through the compact disc player, the duration data codes are produced independently of the time data codes, and the recorder of the MIDI musical instrument does not correlate the duration data codes with the time data codes.

A problem is encountered in the prior art audio playback system for ensemble, i.e., the combination of compact disc player and MIDI musical instrument in that, even if the user concurrently starts the compact disc player and MIDI musical instrument, a time lag is gradually increased between the tones reproduced through the compact disc player and the tones reproduced through the MIDI musical instrument.

SUMMARY OF THE INVENTION

It is therefore an important object of the present invention to provide an audio system, through which a piece of music is reproduced in perfect ensemble.

In accordance with one aspect of the present invention, there is provided a n audio system for reproducing a piece of music in ensemble with another piece of music comprising a first data source having a first memory space for storing a set of first music data codes representative of the piece of music and responsive to a control signal representative of a data transmission rate for transferring the first music data codes from the first memory space, a second data source having a second memory space for storing a set of second music data codes representative of aid another piece of music and different in format from the set of first music data codes and responsive to the control signal for transferring the second music data codes from the second memory space, a data-to-sound converter for producing a first sort of sound and a second sort of sound on the basis of the first music data codes and the second music data codes, respectively, and an ensemble controller connected to the first data source, the second data source and the data-to-sound converter, having a data processing capability and supplying the control signal to the first data source and the second data source through a data processing for equalizing a first data transmission rate for the set of first music data codes with a second data transmission rate for the set of second music data codes.

BRIEF DESCRIPTION OF THE DRAWINGS

The features and advantages of the audio system will be more clearly understood from the following description taken in conjunction with the accompanying drawings, in which.

DESCRIPTION OF THE PREFERRED EMBODIMENTS

System Configuration

Figure 1:
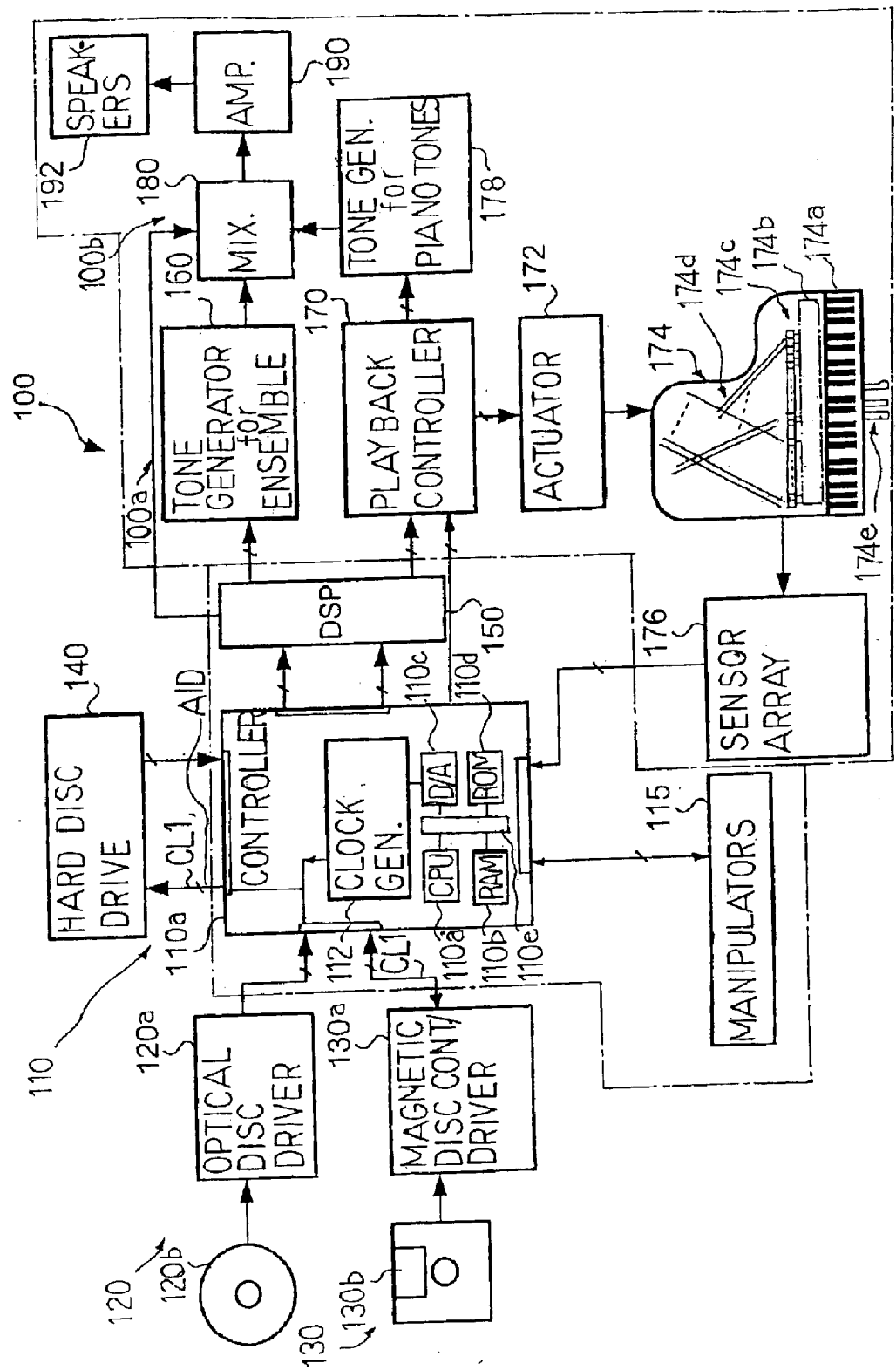
FIG. 1 is a block diagram showing the system configuration of an audio system according to the present invention.

Referring to FIG. 1 of the drawings, the audio system embodying the present invention largely comprises a composite apparatus 100 of audio player and musical instrument, an ensemble controller 110 and a plurality of data sources 120/130/140. The ensemble controller 110 is connected to the plural data sources 120/130/140 and the composite apparatus 100. The ensemble controller 140 selects data sources from the plurality of data sources 120/130/140, and informs the selected data sources 120/130/140 of a data transmission rate. The selected data sources supply pieces of music data to the ensemble controller 110 at the data transmission rate, and the ensemble controller 110 transfers the pieces of music data to the composite apparatus 100. The pieces of music data are assumed to represent plural parts of a piece of music. Thus, the pieces of music data are synchronously transferred from the selected data sources through the ensemble controller 110 to the composite apparatus 100, and the composite apparatus 100 reproduces the plural parts in perfect ensemble.

The pieces of music data stored in the data source 120 are formatted differently from the pieces of music data stored in the other data source 130. In this instance, the pieces of music data stored in the data source 120 are formatted in accordance with the "Red Book", and the pieces of music data stored in the other data source 130 are formatted in accordance with the MIDI standards In other words, the pieces of music data are output from the data source 120 as the audio music data codes, and the other pieces of music data are output from the other data source 130 as the MIDI music data codes.

The audio data codes are successively output from the data source 120 at the given data transmission rate, and the discrete values represented by the audio data codes are restored to an audio signal. On the other hand, the event codes representative of tones are output from the data source 130 at irregular time intervals, and the irregular time intervals are defined by the duration data codes. A number of pulses of a clock signal is indicative of each of the time intervals. In this instance, the data source 130 changes the clock signal to a certain frequency corresponding to the data transmission rate. For this reason, the data source 130 outputs the event codes synchronously with the data transmission of the audio data codes.

If the data source 120 can vary the data transmission rate, the audio data codes are supplied to the ensemble controller 110 synchronously with the transmission of the event codes. If, on the other hand, the data source 120 outputs the audio data codes only at a predetermined data transmission rate, the user may not achieve the synchronous data transmission. In this case, the audio music data codes are to be transferred from the data source 120 to a data storage such as the data source 140, and the audio data codes are read out from the data storage at a read-out speed corresponding to the given data transmission rate. This result in the synchronous data transmission between the data sources 130 and 140.

The composite apparatus 100 of audio player and musical instrument is used in the playback and a recording. In the playback, the composite apparatus 100 processes the pieces of music data codes, and reproduces the plural parts in ensemble. On the other hand, when the audio system is established in the recording mode, the composite apparatus 100 serves as yet another data source. While a part of a piece of music is being reproduced from the pieces of music data, a user plays another part on the composite apparatus 100 in ensemble, and pieces of music data are stored in one of the data sources 120/130/140. If the data transmission rate for the pieces of music data has been known to the ensemble controller 110, it is recommendable to store a piece of control data representative of the data transmission rate in the data source 120/130/140, because the pieces of music data are output from the selected data sources 120/130/140 without any user's instruction.

In case where the audio system is expected to record a performance in ensemble with the tones along the part, the composite apparatus may be replaced with a data generator such as a MIDI musical instrument or a personal computer system. On the other hand, in case where the audio system is used only for the playback, the composite apparatus may be replaced with an audio playback unit. The data sources 120/130/140, composite apparatus 100 and ensemble controller 110 will be hereinafter described in more detail.

Data Source 140

The data source 140 is implemented by a hard disc drive. The hard disc drive 140 is connected to the ensemble controller 110. The ensemble controller 110 supplies a clock signal CL1 to the hard disc drive 140, and gives instruction codes to the hard disc drive 140. Music data is written into and read out from the hard disc drive 140 under the ensemble controller 110. Thus, the music data is transferred between the ensemble controller 110 and the hard disc drive 140.

Figure 2:
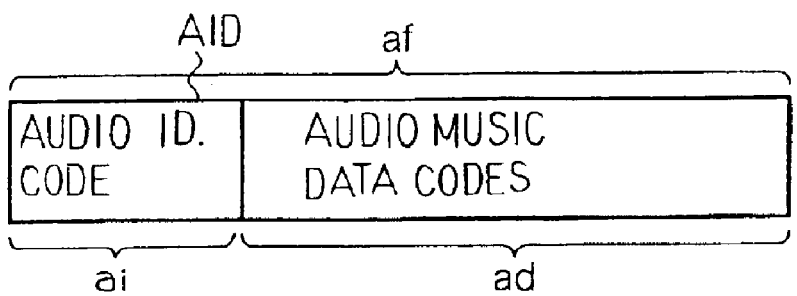
FIG. 2 is a view showing a structure of an audio file.

The hard disc drive 140 includes a magnetic disc and a magnetic head. The relative speed between the magnetic disc and the magnetic head is variable depending upon the frequency of a clock signal CL1. Various sorts of data files are created in the magnetic disc. Audio files af and MIDI files mf are to be created in the magnetic disc. The audio files af are respectively assigned to plural sets of audio music data codes representative of pieces of music. Each of the audio file af has two data fields ai and ad (see FIG. 2), and the two data fields ai/ad are assigned to an audio identification code AID and a set of audio music data codes, respectively.

The audio identification codes AID respectively identify the individual audio files af so that users can specify each piece of music by using the audio identification code AID. A disc identification code may be further stored in the data field ai. The disc identification code represents a compact disc from which the set of audio music data codes is duplicated to the audio file af. A positional data code may be further stored in the data field ai. The positional data code represents where the piece of music or set of audio music data codes is stored in the compact disc.

Figure 3:
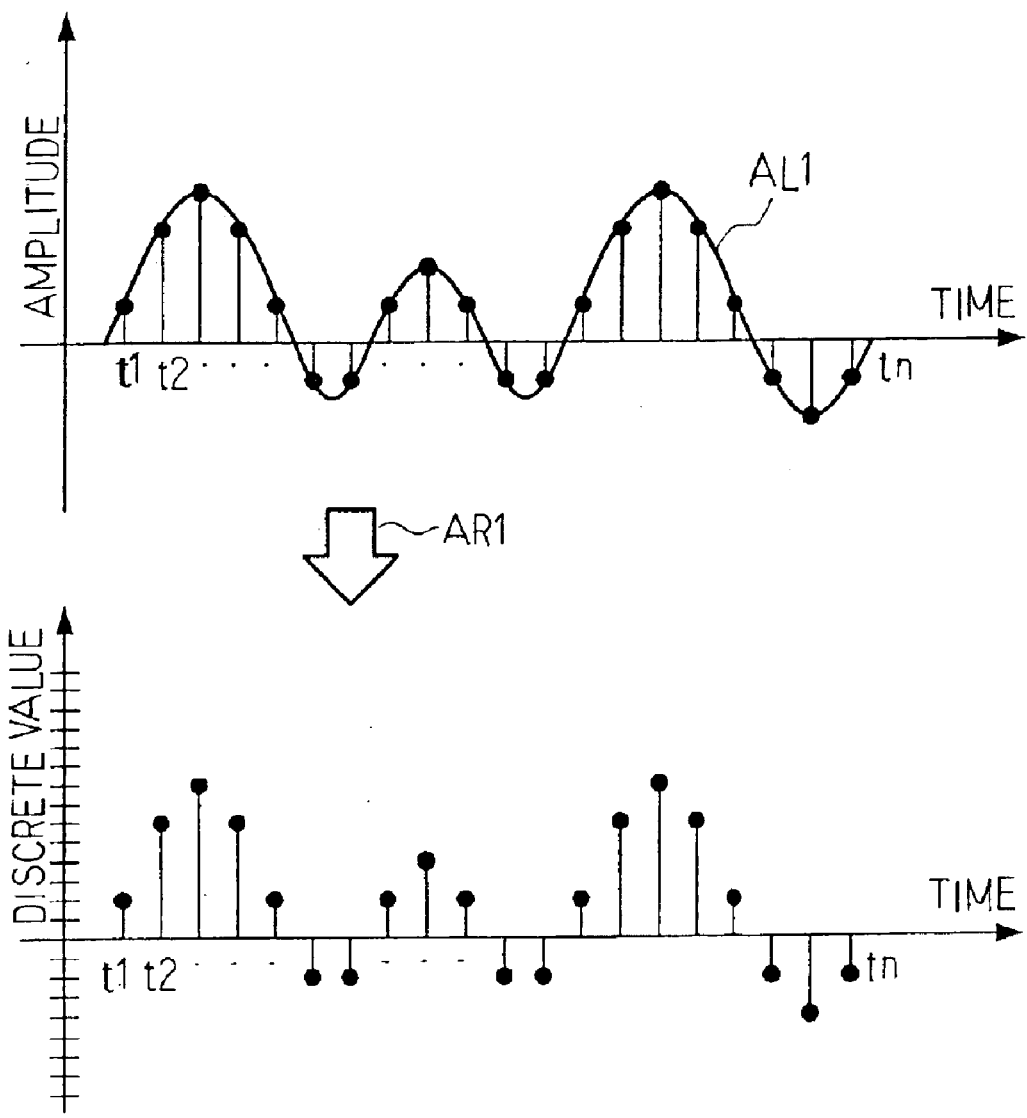
FIG. 3 is a view showing a data conversion from an analog audio signal to audio data codes.

The set of audio music data codes is broken down into the audio data codes representative of momentary discrete values of an analog audio signal and time codes representative of a lapse of time from initiation of the play-back. The analog audio signal was, by way of example, sampled at 44.1 kHz, and the momentary discrete values are converted to the audio data codes. FIG. 3 illustrates the data conversion from an analog audio signal to the audio data codes. The analog audio signal is waved so that the amplitude is varied as indicated by plots AL1. The analog audio signal is sampled at t1, t2, ... and tn, and the magnitude at t1, t2, ... and tn is converted to binary numbers as indicated by arrow AR1. The magnitude at t1, t2, ... and tn is stored in the audio data codes indicative of the momentary discrete values.

The MIDI files mf are also respectively assigned to plural sets of MIDI music data codes representative of pieces of music. Each of the MIDI files mf has two data fields mc and md (see FIG. 4A), and the two data fields mc/md are assigned to control data and a set of MIDI music data codes, respectively. In this instance, a MIDI identification code MID, the audio identification code AID and a transmission rate code TRD are stored in the data field mc.

Figure 4:
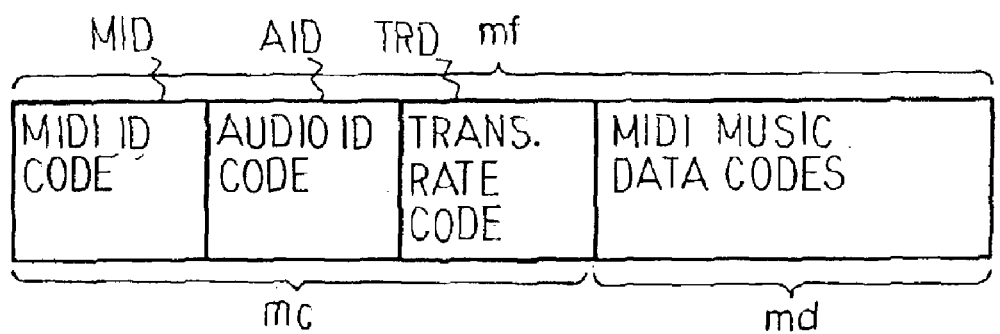
FIG. 4A is a view showing a structure of a MIDI file.
FIG. 4B is a view showing the data arrangement of a part of a set of MIDI music data codes.
Figure 4:
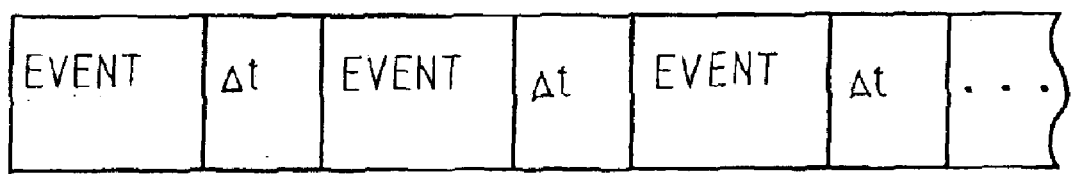

The MIDI identification code MID represents the MIDI file mf and, accordingly, the piece of music stored in the associated data field md. The audio identification code AID represents an audio file where a set of audio music data codes is stored for the ensemble. The transmission rate code TRD is representative of a frequency of the clock signal CL1 equivalent to the data transmission rate. A set of MIDI music data codes includes event codes EC1 representative of events and duration data codes each representative of a time interval $\Delta t$ between the events as shown in FIG. 4B. The time interval is indicated by the number of pulses in the clock signal CL1 so that the event codes are transferred to the ensemble controller 110 synchronously with the transmission of the audio music data codes.

One of the audio data files af is assumed to be specified with the audio identification code AID. The hard disc drive 140 aligns the data field ad with the magnetic field, and sequentially reads out the audio data codes and time data codes from the data field ad at the data read-out speed equivalent to the frequency of the clock signal CL1. The hard disc drive 140 supplies the audio data codes and time data codes to the ensemble controller 110 at the data transmission rate also equivalent to the frequency of the clock signal CL1. If the clock signal CL1 is changed to another frequency, the audio music data codes are transmitted to the ensemble controller 110 at another data transmission rate equivalent to the new frequency of the clock signal CL1.

Data Source 120

The data source 120 is implemented by an optical disc driver 120a and compact discs 120b. The optical disc driver 120a is connected to the ensemble controller 110. The ensemble controller 110 gives instruction codes to the optical disc driver 120a, and the music data is supplied from the optical disc driver 120a to the ensemble controller 110. The optical disc driver 120a is of the standard type having an optical head for radiating a laser beam, and the data read-out speed is constant. The optical disc driver 120a is designed to read out pieces of data representative of the analog audio signal sampled at 44.1 kHz so that the data read-out speed is unchangeable.

The compact discs 120b are of the type storing the music data in the form of pits. Plural sets of audio music data codes or plural sets of MIDI music data codes are stored in each of the compact discs 120b.

When the user specifies a set of audio music data codes, the optical disc driver 120a moves the optical head to the set of audio music data codes. While the optical disc driver 120a is driving the compact disc 120b for data read-out, the laser beam is radiated from the optical head onto the recording surface of the compact disc 120b, and converts the reflection to bit strings. The bit strings are restored to the audio music data codes. The optical disc driver 120a transfers the audio music data codes to the ensemble controller 110 at the data transmission rate equivalent to the constant data read-out speed.

Data Source 130

The data source 130 includes a magnetic disc controller/driver 130a and magnetic discs 130b such as, for example, floppy discs. The magnetic disc controller/driver 130a is connected to the ensemble controller 110. The ensemble controller 110 supplies the clock signal CL1, instruction codes and the event codes to the magnetic disc controller/driver 130a, and the magnetic disc controller/driver 130a determines a time interval between the event code and the previous event code for storing the duration data code, which represents the time interval, in the magnetic disc 130b together with the event code or codes. The magnetic disc controller/driver 130a intermittently reads out the event code or codes and associated duration data codes from the magnetic disc 130b, and supplies the event code or codes to the ensemble controller 110 upon expiry of the time interval indicated by the duration data code. Thus, the magnetic disc controller/driver 130a records a performance on the composite apparatus 100 in the magnetic disc 130b in the form of a set of MIDI music data codes, and reproduces the performance on the basis of the set of MIDI music data codes.

The magnetic disc controller/driver 130a includes a microprocessor, a program memory, a working memory, a magnetic head and a driver circuit. A main routine program and subroutine programs are stored in the program memory, and the microprocessor sequentially fetches the instruction codes of these computer programs from the program memory for achieving the given tasks. The microprocessor temporarily stores the event codes and data codes in the working memory, and a counter is created in the working memory for the duration data codes.

When the audio system is powered, the microprocessor starts to execute a main routine program, and periodically checks the interface between the ensemble controller 110 and the magnetic disc controller/driver 130a to see whether or not the ensemble controller 110 newly assigns a task to the magnetic disc controller/driver 130a. If the ensemble controller 110 requests the magnetic disc controller/driver 310a to record a performance on the composite apparatus 100 synchronously with the playback of a piece of music represented by a set of audio music data codes, the main routine program branches a subroutine program for recording, and the subroutine program for recording branches a subroutine program at every timer interruption. The ensemble controller 110 supplies the MIDI identification code MID, audio identification code AID and transmission rate code TRD to the microprocessor together with the instruction code representative of the request for the synchronous recording. On the other hand, if the ensemble controller 110 requests the magnetic disc controller/driver 130a to transfer the event codes thereto for a playback synchronously with the playback of the piece of music, the main routine program branches to another subroutine program for playback, and the subroutine program for playback also branches to the subroutine program at every timer interruption.

The ensemble controller 110a is assumed to request the magnetic disc controller/driver 130a to record a part of a piece of music synchronously with playback of another part represented by audio data codes. The ensemble controller 110*a* supplies the control data, viz., the MIDI identification code MID, audio identification code AID and transmission rate code TRD to the microprocessor. When the microprocessor acknowledges the instruction, the main routine program branches to the subroutine program for recording, and the microprocessor creates the MIDI file mf in the magnetic disc 130*b*. The microprocessor writes the MIDI identification code MID, audio identification code AID and transmission rate code TRD into the data field mc, and waits for the event code.

The microprocessor periodically checks the interface between the ensemble controller 110 and the magnetic disc controller/driver 130*a* to see whether or not any event code reaches there. The first event code is representative of initiation of the performance. When the first event code reaches the interface, the microprocessor instructs the driver circuit to write the first event code in the data field md with the magnetic head, and starts a software timer for the timer interruption. In this instance, the timer interruption takes place at time intervals equal to the pulse period of the clock signal CL1. Upon entry into the subroutine program at every timer interruption, the microprocessor increments the counter by one. Thus, the microprocessor determines a time period by using the pulse period of the clock signal CL1 as unit.

When the next event code or codes reach the interface, the microprocessor reads out the number of pulses stored in the counter, and resets the counter to zero. The microprocessor stores the time period indicated by the number of pulses in the duration data code, and instructs the driver circuit to write the event code or codes together with the duration data code in the data field md with the magnetic head.

The microprocessor repeats the above-described jobs until the ensemble controller 110 informs the microprocessor of completion of the performance. Then, the microprocessor instructs the driver circuit to write the event code representative of the end of the performance in the data field md with the magnetic head.

The ensemble controller 110 is assumed to request the magnetic disc controller/ driver 130*a* to transfer the MIDI music data codes thereto for the synchronous playback. When the microprocessor acknowledges the instruction, the main routine program branches to the subroutine program for the playback, and the subroutine program for the playback branches to the subroutine program at every timer interruption. When the event code or codes representative of a note event or events are read out from the magnetic disc 130*b* together with the duration data code, the microprocessor stores the number of pulses indicated by the duration data code in the counter The number stored in the counter is decremented by one at every timer interruption. When the number in the counter reaches zero, the microprocessor transfers the event code to the ensemble controller 110, and reads out the next event code or codes and the duration data code. The number of pulses indicated by the duration data code is also stored in the counter, and is decremented by one at every timer interruption. Thus, the microprocessor determines the expiry of the time period between the read-out of event codes and the transmission of the event codes by using the pulses of the clock signal CL1.

Composite Apparatus

The composite apparatus 100 largely comprises a playback system 100*a*, a sound system 100*b*, an acoustic piano 174 and a sensor array 176. The acoustic piano 174 is a standard grand piano. However, an upright piano may serve as the acoustic piano. The playback system 100*a* is connected to the ensemble controller 110, and event codes are supplied from the ensemble controller 110. The playback system 100*a* analyzes the event codes, and makes the acoustic piano 174 and sound system 100*b* selectively produce acoustic piano tones and electronic tones. The ensemble controller 110 is further connected to the sound system 100*b*, and directly supplies an analog audio signal to the sound system 100*b* for producing electric tones.

The acoustic piano 174 includes a keyboard 174*a*, action units 174*b*, hammers 174*c*, strings 174*d* and pedals 174*e*. The keyboard 174*a* is exposed to a human player so that the human player can perform a piece of music on the keyboard 174*a*. The action units 174*b* are linked with the black/white keys of the keyboard 174*a*, and are selectively actuated by the depressed black/white keys. The actuated action units 174*b* drive the associated hammers 174*c* for rotation at the escape, and the hammers 174*c* strike the associated strings 174*d* at the end of the rotation. Then, the strings vibrate so that the acoustic piano tones are radiated from the vibrating strings 174*d*. The pedals 174*e* are used for imparting effects to the acoustic piano tones. When the damper pedal 174*e* is depressed, the acoustic piano tones are prolonged. The soft pedal 174*e* makes the loudness of the acoustic piano tones smaller than usual, and the sustain pedal 174*e* causes the individual acoustic tones to be prolonged. Thus, the parts 174*a* to 174*e* behaves as similar to the standard grand piano.

The playback system 100*a* includes a tone generator for ensemble 160, a playback controller 170, solenoid-operated actuators 172 and a tone generator for piano tones. The tone generator for ensemble 160 and playback controller 170 are connected in parallel to the ensemble controller 110, and the event codes are selectively supplied from the ensemble controller 110 to the tone generator for ensemble 160 and playback controller 170. The event codes representative of the piano tones are supplied to the playback controller 170, and the event codes representative of other sorts of tones are supplied to the tone generator for ensemble 160. The tone generator for ensemble 160 produces a digital audio signal on the basis of the event codes. The digital audio signal is converted to an analog audio signal, which is supplied to the sound system 100*b*.

On the other hand, the playback controller 170 supplies the event codes to the tone generator for piano tones 178, or selectively supplies a driving signal to the solenoid-operated actuators 172. The user has instructed the playback controller 170 which is the destination through the ensemble controller 110.

If the user has instructed the playback controller 110 to transfer the event codes to the tone generator for piano tones 178, the tone generator for piano tones 178 receives the event codes representative of the acoustic piano tones, and produces a digital audio signal on the basis of the event codes. The digital audio signal is converted to an analog audio signal, and the analog audio signal is supplied from the tone generator for piano tones 178 to the sound system 100*b*.

If, on the other hand, the user has instructed the playback controller 110 to supply the driving signal to the solenoid-operated actuators 172, the playback controller 170 analyzes the event codes, and determines the black/white keys to be moved and the loudness of each acoustic piano tone. If the event code represents an effect to be imparted to the acoustic piano tones, the playback controller 170 determines a pedal 174*e* to be depressed and a depth over which the pedal 174*e* is to be depressed. The playback controller 170 adjusts the driving signal to a certain duty ratio equivalent to the loudness or depth, and supplies the driving signal to the solenoid-operated actuator 172 associated with the black/white key or pedal.

The solenoid-operated actuators 172 are provided under the black/white keys and over the pedals 174e. When the driving signal flows through the coil of the solenoid-operated actuator 172, the plunger projects from the bobbin, and depresses the associated black key/white key/pedal. Thus, the solenoid-operated actuators 172 selectively move the associated black/white keys and pedals 174e without any fingering/step of the human player. This results in the generation of the acoustic piano tones and the effects imparted to the acoustic piano tones.

The sound system 100b includes a mixer 180, an amplifier 190 and loud speakers 192. The analog signals are supplied from the ensemble controller 110, tone generator for ensemble 160 and tone generator for piano tones 178 to the mixer 180, and are mixed into a single audio signal. The frequency components of the audio signal are equalized, and the equalized audio signal is amplified through the amplifier 190. The audio signal is supplied from the amplifier 180 to the loud speakers 192, and is converted to the electric/electronic tones.

The sensor array 176 includes key sensors and pedal sensors. The key sensors monitor the black/white keys, respectively, and the pedal sensors monitor the pedals 174e, respectively. The key/pedal sensors 176 generate analog key/pedal position signals representative of current key/current pedal positions, and the analog key position signals and analog pedal position signals are converted to digital key position signals and digital pedal position signals also representative of the current key/current pedal positions. The digital key position signals and digital pedal position signals are periodically supplied from the sensor array 176 to the ensemble controller 110. The ensemble controller 110 analyzes the digital key position signals and digital pedal position signals for producing the event codes. First, the ensemble controller 110 specifies the depressed black/white keys 174a and/or depressed pedals 174e, and calculates the velocity of each depressed key and/or the depth of each depressed pedal 174e. The note number assigned to each depressed black/white key and velocity are stored in the event codes, and the depressed pedal and depth are also stored in the event codes. Thus, the sensor array 176 informs the ensemble controller 110 of the pieces of music data representative of the performance.

Ensemble Controller

The ensemble controller 110a includes a controller 110a, a manipulating panel 115 and a digital signal processor 150. The controller 110a is connected to the optical disc driver 120a, magnetic disc controller/driver 130a, hard disc drive 140, sensor array 176, manipulator 115 and digital signal processor 150. The manipulating panel 115 has plural manipulators such as switches, keys and levers, and several indicators and display window are also provided on the manipulating panel 115. The switches and levers are selectively manipulated by users so that instructions are given to the controller 110a through the manipulating panel 115. The user powers the audio system by manipulating a power switch, and changes the mode of operation through other switches. The user further selects the sound source 174 or 178 from the composite apparatus 100 by manipulating yet another switch. The user manipulates a lever for changing a tempo. The user enters a title of a piece of music to be performed or to be reproduced into the ensemble controller 110 through the keys.

The digital signal processor 150 is abbreviated as "DSP" in FIG. 1. The digital signal processor 150 achieves two major tasks. One of the major tasks is to produce the analog audio signal from the audio data codes. While the optical disc driver 120a or hard disc drive 140 is reading out the audio music data codes from the compact disc 120b or magnetic disc, the audio music data codes, viz., the audio data codes and time data codes successively reach the controller 110a. The controller 110a transfers the audio data codes to the digital signal processor 150 without changing the data transmission rate. The digital signal processor 150 restores the audio data codes to the analog audio signal, and supplies the analog audio signal to the mixer 180. When the digital signal processor 150 converts each audio data code to a part of the analog audio signal, the digital signal processor 150 latches the audio data code at the timing defined by the clock signal CL1 so that the series of audio data codes are restored to the analog audio signal with the waveform equivalent to that of the original analog audio signal.

The other major task is to distribute the event codes to the tone generator for ensemble 160 and the playback controller 170. As described hereinbefore, the magnetic disc controller/driver 130a intermittently transfers the event codes to the controller 110a. The controller 110a supplies the event codes to the digital signal processor 150. If the event codes represent the piano tones, the digital signal processor 150 supplies the event codes to the playback controller 170. If, on the other hand, the event codes represent other sorts of tones, the digital signal processor 150 supplies the event codes to the tone generator for ensemble 160. Thus, the digital signal processor 150 selectively distributes the event codes to the playback controller 170 and tone generator for ensemble 160 depending upon the timbre of the tones to be reproduced. In the data transmission, the digital signal processor 150 keeps the data transmission rate equivalent to the clock signal CL1.

The controller 110a is responsive to the user's instructions given through the manipulating panel 115 so as to record a performance of a part of a piece of music on the acoustic piano 174 synchronously with the playback of another part stored in an audio file af and reproduce the performance synchronously with the playback of the other part Although the audio system is responsive to other user's requests such as, for example, a simple playback of a piece of music stored in the audio file af, a simple playback of a piece of music stored in the MIDI file mf and a single recording of user's performance on the acoustic piano 174, description is omitted for the sake of simplicity Description is focused on the synchronous recording and synchronous playback.

In the recording mode, the controller 110a cooperates with the optical disc driver/hard disc drive 120a/140, digital signal processor 150, sound system 100b, sensor array 176 and magnetic disc controller/driver 130a. The controller 110a requests the optical disc driver/hard disc drive 120a/140 to look for the set of audio music data codes where the piece of music is stored. When the set of audio music data codes is found, the optical disc driver 120a transfers the set of audio music data codes to the controller 110a, and the controller 110a in turn transfers the set of audio music data codes to the hard disc drive 140. The hard disc drive 140 creates au audio file af, and stores the set of audio music data codes in the data field ad.

Subsequently, the controller 110a instructs the magnetic disc controller/driver 130a to create a MIDI file mf in the magnetic disc 130b, and supplies the MIDI identification code MID, audio identification code AID and data transmission rate TRD to the magnetic disc controller/driver 130a. The user gives a title of the piece of music to be performed through the manipulating panel 115, and the controller 110a stores the title in the MIDI identification code MID The audio identification code AID has been already read out from the compact disc 120*b*. The controller 110*a* stores the data transmission rate or data read-out speed defined in the Red Book in the internal non-volatile memory as a default value. The controller 110*a* supplies the transmission rate code TRD representative of the default value to the magnetic disc controller/driver 130*a* in so far as the user does not give any data transmission rate through the manipulating panel 115. The magnetic disc controller/driver 130*a* stores those data codes MID, AID and TRD in the data field mc.

Subsequently, the controller 110*a* adjusts the clock signal CL1 to a frequency equivalent to the data transmission rate for the audio music data codes, and starts to supply the clock signal CL1 to the magnetic disc controller/driver 130*a* and the hard disc drive 140.

Subsequently, the controller 110*a* instructs the hard disc drive 140 to read out and transfer the audio music data codes from the data field ad of the audio file af. The hard disc drive 140 is responsive to the clock signal CL1 so as to read out and transfer the audio music data codes from the magnetic disc. The audio music data codes reach the controller 110*a*. The controller 110*a* transfers the audio data codes to the digital signal processor 150 without changing the data transmission rate. The controller 110*a* keeps the data transmission rate equivalent to the frequency of the clock signal CL1. The digital signal processor 150 produces the analog audio signal from the audio data codes, and the sound system 100*b* generates the electric tones.

When the electric tone is radiated from the loud speaker 192, the user starts to perform the part of the piece of music. While the user is performing the part, the sensor array 176 supplies the digital key position signals and digital pedal position signals to the controller 110*a*. The controller 110*a* analyzes the pieces of music data represented by the digital key position signals/digital pedal position signals, and produces the event codes on the basis of the music data. The controller 110*a* supplies the event code or codes to the magnetic disc controller/driver 130*a*. The magnetic disc controller/driver 130*a* produces the duration data code, and writes the event code or codes and the associated duration data code in the data field md. The controller 110*a* intermittently supplies the event codes representative of the performance to the magnetic disc controller/driver 130*a*, and the magnetic disc controller/driver 130*a* writes the event codes and the associated duration codes until the user finishes the performance.

The user is assumed to instruct the controller 110*a* to reproduce the per-formance on the part of the piece of music synchronously with the playback of the other part through the manipulating panel. The user specifies the piece of music through the manipulating panel 115. The controller identifies the piece of music with the MIDI identification code MID, and supplies the MIDI identification code MID to the magnetic disc controller/driver 130*a*. The magnetic disc controller/driver 130*a* selects the MIDI file mf from the magnetic disc 130*b*, and transfers the audio identification code AID and transmission rate code TRD from the data field mc to the controller 110*a*.

The controller 110*a* transfers the audio identification code AID to the optical disc driver 120*a*, and instructs the optical disc driver 120*a* to transfer the set of audio music data codes identified with the audio identification code AID thereto. The optical disc driver 120*a* selects the set of audio music data codes from the compact disc or another compact disc 120*b*, and transfers the set of audio music data codes from the compact disc 120*b* to the controller 110*a*. The controller 1110*a* in turn transfers the set of audio music data codes to the hard disc drive 140, and the set of audio music data codes is stored in an audio file af created in the magnetic disc of the hard disc drive 140.

The controller 110*a* checks the control data to see whether or not the clock signal CL1 has been adjusted to the frequency equivalent to the data transmission rate. If the answer is given negative, the controller 110*a* adjusts the clock signal CL1 to the proper frequency.

Upon completion of the preparatory work, the controller 110*a* instructs the magnetic disc controller/driver 130*a* and hard disc drive 140 to start the data read-out from the MIDI file mf and audio file af. If the user's option was on the tone generator for piano tones 178, the magnetic disc controller/driver 130*a* and hard disc drive 140 concurrently start the data read-out from the magnetic disc 130*b* and internal magnetic disc. If, on the other hand, the user's option is on the acoustic piano 174, the controller 1110*a* starts the data read-out from the MIDI file mf earlier than the data read-out from the hard disc drive 140, because the key action unavoidably retards the acoustic piano tones. The time lug between the data read-out and the acoustic piano tones is constant. Thus, the controller 110*a* controls the magnetic disc controller/driver 130*a* and hard disc drive 140 in such a manner that the acoustic piano 174 generates the acoustic piano tones in perfect ensemble with the sound system 100*b*.

The hard disc drive 140 is responsive to the clock signal CL1 so that the audio music data codes are transferred from the data field ad of the audio file af to the controller 110*a*. On the other hand, the magnetic disc controller/driver 130*a* intermittently reads out the event codes and associated duration data codes from the data field md of the MIDI file mf The magnetic disc controller/driver 130*a* determines the time intervals between the transmission of event code or codes and the next transmission of event code or codes by using the clock signal CL1, and intermittently supplies the event codes to the controller 110*a*.

The controller 110*a* selects the audio data codes from the audio music data codes, and supplies the audio data codes to the digital signal processor 150. The controller 110*a* keeps the data transmission rate equivalent to the frequency of the clock signal CL1. The digital signal processor 150 produces the analog audio signal to the mixer 180, and the electric tones are radiated from the loud speakers 192. The controller 110*a* further supplies the event codes to the digital signal processor 150, and the digital signal processor 150 selectively supplies the event codes to the tone generator for ensemble 160 and the playback controller 170 without changing the data transmission rate. The tone generator for ensemble 160 produces the analog audio signal on the basis of the event codes, and supplies the analog audio signal to the mixer 180. On the other hand, the playback controller 170 supplies the event codes to either tone generator for piano tones 178 or the solenoid-operated actuators 172 depending upon the user's option.

When the user selected the tone generator for piano tones 178, the tone generator for piano tones 178 produces the analog audio signal on the basis of the event codes, and supplies the analog audio signal to the mixer 180 for generating the electronic piano tones. If the user selected the solenoid-operated actuators 172, the playback controller 170 analyzes the event codes, and supplies the driving signal to the solenoid-operated actuators 172. The solenoid-operated actuators 172 give rise to the key action and pedal action, and generates the acoustic piano tones. Thus, the audio system according to the present invention achieves the perfect ensemble between the electric tones and piano tones by virtue of the clock signal CL1 supplied to both of the magnetic disc controller/driver 130a and hard disc drive 140.

Description is hereinafter made on the system configuration of the controller 110a. The controller 110a includes a central processing unit 110a', a random access memory 110b, a digital-to-analog converter 110c, a read-only memory 110d, a bus system 110e and a clock generator 112. Control data such as the default value of the data transmission rate and computer programs are stored in the read-only memory 110d, which is abbreviated as "ROM", and the random access memory 110b, which is abbreviated as "RAM", serves as a working memory. The central processing unit 110a' is abbreviated as "CPU". The central processing unit 110a', random access memory 110b, digital-to-analog converter 110c and read only memory 110d are connected to the bus system 110e. The digital-to-analog converter 110c produces a control voltage signal under the control of the central processing unit 110a', and supplies the control voltage signal to the clock generator 112. In this instance, the clock generator 112 is implemented by a voltage-controlled oscillator. The voltage-controlled oscillator is responsive to the control voltage signal so that the central processing unit 110a' can vary the frequency of the clock signal CL1. The clock signal CL1 is supplied from the clock generator 112 to the magnetic disc controller/driver 130a and hard disc drive 140.

The central processing unit 110a' sequentially fetches instruction codes of the computer programs. When the user energizes the controller 110a, the central processing unit 110a' starts to execute a main routine program. In the main routine program, the central processing unit 110a' periodically checks the manipulating panel 115 to see whether or not the user manipulates any one of the switches, keys and levers. The user is assumed to give an instruction through the manipulating penal 115 to the audio system. The answer is given positive, and the main routine program branches to a subroutine program depending upon the given instruction.

If the user selects the tone generator for piano tones from the composite apparatus, the central processing unit 110a' supplies an instruction code representative of the user's option to the playback controller 170, and makes the playback controller 170 get ready for transferring the event codes to the tone generator for piano tones 178. If the user enters a title of a piece of music to be recorded and/or a tempo before selecting the mode of operation, the central processing unit 110a' produces the MIDI identification code and/or transmission rate code, and temporarily stores them in the random access memory 110b.

The user is assumed to instruct the audio system to record a part of a piece of music synchronously with the playback of another part represented by a set of audio music data codes. The user enters the title of the piece of music through the manipulating panel 115. However, the user does not give the tempo to the ensemble controller 110.

The central processing unit 110a' supplies a data code representative of the title of the piece of music to the optical disc driver 120a, and requests the optical disc driver 120a to check the compact disc 120b to see whether or not the piece of music has been recorded therein. If the answer is given negative, the optical disc driver 120a reports absence to the central processing unit 110a'. Then, the central processing unit 110a' requests the manipulating panel 115 to produce a massage such as "the title is not found in the disc" in the display window. If another compact disc is inserted into the optical disc driver 120a, the optical disc driver checks the compact disc 120b for the piece of music. Thus, the central processing unit 110a' cooperates with the optical disc driver 120a and manipulating panel 115 until the optical disc driver 120a reports the audio identification code AID to the controller 110a.

When the central processing unit 110a' acknowledges the audio identification code AID, the central processing unit 110a' temporarily stores the audio identification code AID in the random access memory 110b, instructs the hard disc drive 140 to creates the audio file af for the piece of music labeled with the audio identification code AID. The central processing unit 110a' requests the optical disc driver 120a to transfer the audio music data codes to the hard disc drive 140. The optical disc driver 120a reads out the audio music data codes from the compact disc 120b, and transfers them through the controller 110a to the hard disc drive 140. The audio music data codes are sequentially written in the data field ad, Thus, the audio file af is created in the magnetic disc of the hard disc drive 140.

The central processing unit 110a' instructs the magnetic disc controller/driver 130a to check the magnetic disc 130b whether or not the vacant memory space is much enough to create a new MIDI file mf, concurrently with the instructions to the optical disc driver 120a. If the vacant memory space is short, the magnetic disc controller/driver 130a reports the shortage to the central processing unit 110a'. Then, the central processing unit 110a' requests the manipulating panel 115 to produce a massage such as "Change the disc" on the display window. Thus, the central processing unit 110a' cooperates with the magnetic disc controller/driver 130a and manipulating panel 115 until the magnetic disc controller/driver 130a finds the vacant memory space available for the recording.

When the optical disc driver 120a and magnetic disc controller/driver 130a get ready, the central processing unit 110a' supplies the MIDI identification code, audio identification code and the transmission rate code TRD representative of the default value to the magnetic disc controller/driver 130a, and instructs the magnetic disc controller/driver 130a to store the MIDI identification code MID, audio identification code AID and transmission rate code TRD in the data field mc of the MIDI file mf.

Furthermore, the central processing unit 110a' supplies the control data code representative of the default value to the digital-to-analog converter 110c. The digital-to-analog converter 110c changes the control voltage signal to the potential level proper to the frequency equivalent to the default data transmission rate. The control voltage signal makes the clock generator 112 to oscillate at the given frequency. The clock generator 112 supplies the clock signal CL1 at the given frequency to the hard disc drive 140 and the magnetic disc controller/driver 130a.

Subsequently, the central processing unit 110a' instructs the hard disc drive 140 to read out the audio music data codes from the audio file af, and gives a sign to the player who sits in front of the keyboard 174a. The central processing unit 110a' notifies the magnetic disc controller/driver 130a of the initiation of the synchronous recording through the first event code. The magnetic disc controller/driver 130a writes the event code in the data field md of the MIDI file mf, and starts to count the pulses of the clock signal CL1.

The audio music data codes are transferred from the bard disc drive 140 through the controller 110a to the digital signal processor 150, and the digital signal processor 150 supplies the analog audio signal to the mixer 180 so that the electric tones are generated from the loud speakers 192 for the give part On the other had, the player starts the fingering on the keyboard 174a at the given sign. While the player is playing the other part on the acoustic piano 174, the sensor array 176 supplies the digital key position signals and digital pedal position signals to the interface of the controller 110a. The central processing unit 110a' transfers the pieces of positional data represented by the digital key position signals/ digital pedal position signals to the random access memory 110b, and the pieces of positional data are accumulated therein. The central processing unit 110a' periodically checks the accumulated pieces of positional data to see whether or not the player moves any one of the black/white keys 174a and pedals 174e. The player is assumed to depress a black/white key and release another black/white key. The answer is given affirmative, and the central processing unit 110a' identifies the depressed key and released key with respective note numbers. The central processing unit 110a' calculates the velocity on the basis of the accumulated positional data, and produces event codes representative of the note-on event and note-off event. If the player steps on one of the pedals 174e, the answer is also given affirmative, and the central processing unit 110a' produces the event code representative of the effect to be imparted to the tones.

The central processing unit 110a40 supplies the event code or codes to the magnetic disc controller/driver 130a. When the magnetic disc controller/driver 130a receives the event code or codes, the magnetic disc controller/driver 130a reads out the value presently stored in the counter, and produces the duration data code. The magnetic disc controller/driver 130a resets the counter to zero, and restarts to count up the pulses of the clock signal CL1. The magnetic disc controller/driver 130a writes the event code/codes and duration data code in the data field md of the MIDI file mf.

While the player is playing the part of the piece of music, the central processing unit 110a' intermittently supplies the event codes to the magnetic disc controller/driver 130a, and the magnetic disc controller/driver 130a stores the event codes together with the duration data codes in the data field md of the MIDI file mf Thus, the central processing unit 110a' cooperates with the sensor array 176 and magnetic disc controller/driver 130a for recording the performance in the MIDI file mf.

When the player instructs the audio system to reproduce the performance synchronously with the playback through the sound system 100b, the central processing unit 110a' behaves as follows.

First, the central processing unit 110a' requests the magnetic disc controller/driver 130a to check the magnetic disc 130b for the MIDI file mf where the performance is stored If the magnetic disc 130b does not store the MIDI file mf, the magnetic disc controller/driver 130a reports the absence to the central processing unit 110a'. Then, the central processing unit 110a' instructs the manipulating panel 115 to produce a message such as "change the magnetic disc" in the display window so as to prompt the user to change the magnetic disc 130b.

When the magnetic disc controller/driver 130a finds the MIDI file mf, the magnetic disc controller/driver 130a reads out the audio identification code AID and transmission rate code TRD, and supplies them to the central processing unit 110a'.

The central processing unit 110a' transfers the audio identification code AID to the optical disc driver 120a, and requests the optical disc driver 120a to check the compact disc 120b for the set of audio music data codes labeled with the audio identification code AID. If the set of audio music data codes is absent, the optical disc driver 120a reports the absence to the central processing unit 110a', and the central processing unit 110a' makes the manipulating panel 115 to produce the prompt message in the display window.

When the central processing unit 110a' acknowledges the audio music data codes, the central processing unit 110a' requests the hard disc drive 140 to create the audio file af in the magnetic disc and the optical disc driver 120a to transfer the set of audio music data codes to the hard disc drive 140 through the controller 110a. The hard disc drive 140 stores the set of audio music data codes in the data field ad. Thus, the set of audio music data codes is duplicated into the hard disc drive 140.

When the transmission rate code TRD reaches the central processing unit 110a', the central processing unit 110a' supplies the control data code representative of the data transmission rate to the digital-to-analog converter 110c. The digital-to-analog converter 110c adjusts the control voltage signal to the potential level corresponding to the data transmission rate. The control voltage signal is supplied to the clock generator 112, and the clock generator 112 oscillates at the given frequency equivalent to the target data transmission rate. The clock signal CL1 is supplied to the hard disc drive 140 and magnetic disc controller/driver 130a.

When the preparatory works are completed, the central processing unit 110a' requests the magnetic disc controller/ driver 130a to read out the MIDI music data codes from the MIDI file mf concurrently with or prior to the data read-out of the audio music data codes depending upon the user's option between the acoustic piano 174 and the tone generator for piano tones 178.

The audio music data codes are successively read out from the magnetic disc synchronously with the clock signal CL1, and are transferred from the hard disc drive 140 through the controller 110a to the digital signal processor 150 at the target data transmission rate. The digital signal processor 150 produces the analog audio signal from the audio data codes, and supplies it to the mixer 180.

On the other hand, the magnetic disc controller 130a intermittently supplies the event codes to the controller 110a, and measures the time period between the transmission of event code/codes and the previous transmission of event code/codes by using the clock signals CL1. The central processing unit 110a' transfers the event code/codes to the playback controller 170, and the playback controller 170 supplies the event code/codes or the driving signal to the tone generator for piano tones 178 or the solenoid-operated actuators 172 depending upon the user's option.

If the event code/codes are supplied to the tone generator for piano tones 178, the tone generator for piano tones 178 produces the analog audio signal on the basis of the event codes, and supplies the analog audio signal to the mixer 180. The sound system 100b reproduces the electric tones and electronic tones in the ensemble same as that in the recording mode.

If, on the other hand, the event codes are supplied to the solenoid-operated actuators 172, the solenoid-operated actuators give rise to the key action and pedal action, and the acoustic tones are produced from the vibrating strings 174d. Although the time lug is introduced into the mechanical action, the magnetic disc controller/driver 130a starts the data read-out earlier than the data read-out of the hard disc drive 140 by a time period equal to the time lug. This results in the perfect ensemble between the acoustic piano tones and the electric tones.

Synchronous Recording/Synchronous Playback

Figure 5:
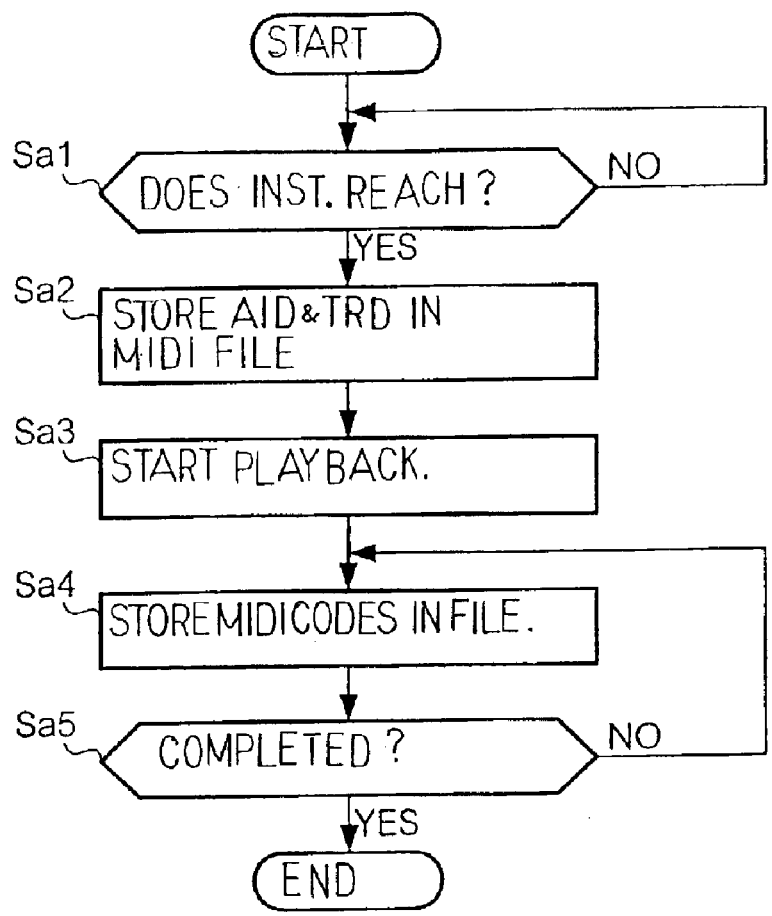
FIG. 5 is a flowchart showing a method for creating the MIDI file.
Figure 6:
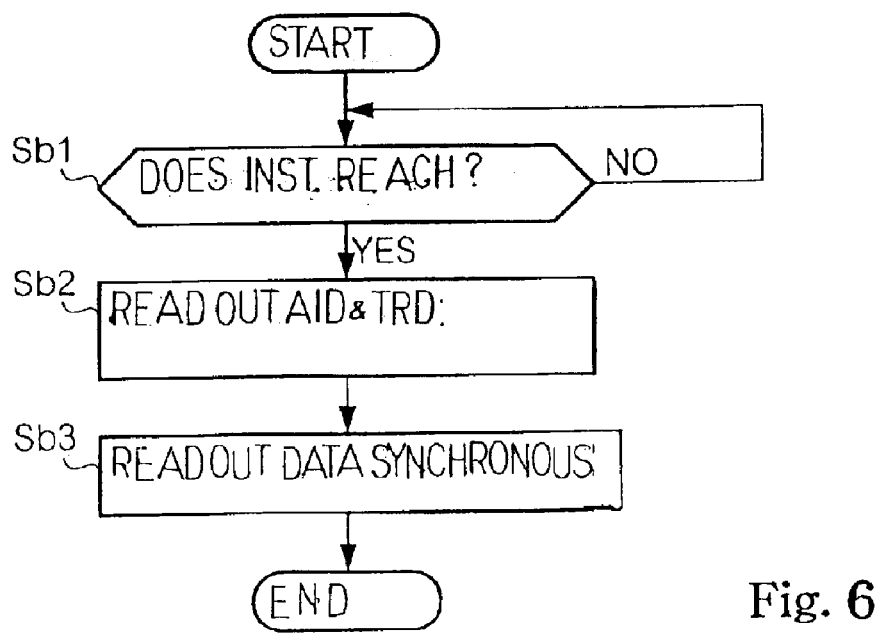
FIG. 6 is a flowchart showing a method of a synchronous playback.

The control sequence for the synchronous recording and control sequence for the synchronous playback are illustrated in FIGS. 5 and 6. The user is assumed to instruct the synchronous recording to the audio system. The user inserts the compact disc 120b and magnetic disc 130b into the optical disc driver 120a and magnetic disc controller/driver 130a. The piece of music to be reproduced has been already recorded in the compact disc 120b, and the magnetic disc 130b has unused memory space where a MIDI file mf is created. The audio system creates an audio file af in the magnetic disc of the hard disc drive 140, and duplicates the set of audio music data codes from the compact disc 120b to the data field ad of the audio file af.

The audio system starts the control sequence shown in FIG. 5. First, the audio system checks the manipulating panel to see whether or not the user instructs the synchronous recording as by step Sa1. If the user has not instructed the synchronous recording to the audio system, the answer is given negative "NO", and the audio system repeats step Sa1. The audio identification code AID and transmission rate data TRD are to be supplied to the audio system together with the instruction for the synchronous recording.

When the user instructs the synchronous recording to the audio system, the answer at step Sa1 is changed to affirmative "YES", and the audio system creates a MIDI file mf in the magnetic disc 130b. The audio identification code AID and transmission rate data TRD are written in the MIDI file fin as by step Sa2. The audio identification code AID makes the MIDI file mf corresponding to the audio file af The MIDI music data codes have not been written in the data file md of the MIDI file mf.

The audio system successively reads out the audio music data codes from the audio file af synchronously with the clock signal CL1, and reproduces the electric tones as by step Sa3. The user starts the performance on the acoustic piano 174 concurrently with the playback, and the audio system produces the event codes and duration codes representative of the performance. The audio system determines the time intervals between the events by using the clock signal CL1. The audio system stores the event codes and associated duration codes in the data field md of the MIDI file mf as by step Sa4. Although step Sa3 is followed by step Sa4, the playback and recording are carried out in parallel.

The audio system checks the manipulating panel 115 to see whether or not the user has completed the performance as by step Sa5. While the user is continuing the fingering, the answer at step Sa5 is given negative "NO", and the control returns to step Sa4. Thus, the audio system reiterates the loop consisting of steps Sa4 and Sa5 until the user completes the performance.

When the user completes the performance, he or she instructs the audio system to terminate the recording, and the answer at step Sa5 is changed to affirmative "YES". Then, the audio system exits from the control sequence.

If the user wishes to slow down or speed up the performance, the user gives his or her tempo to the audio system, and the audio system adjusts the clock signal CL1 to the frequency corresponding to the new tempo.

As will be understood from the foregoing description, the audio system transfers the audio data codes at the data transmission rate equivalent to the frequency of the clock signal CL1, and clocks the intervals between the transmission of event codes by also using the clock signal CL1. Thus, the audio system controls the playback and recording with the clock signal CL1. This results in the perfect ensemble.

The user is assumed to instruct the synchronous playback to the audio system. The user has already inserted the compact disc 120b and magnetic disc 130b into the optical disc driver 120a and magnetic disc controller/driver 130a, and the audio system has already duplicated the set of audio music data codes to the audio file af created in the hard disc drive 140. The tone generator for piano tones 178 has been selected from the composite apparatus 100.

First, the audio system check the manipulating panel 115 to see whether or not the user has instructed the synchronous playback to the audio system as by step Sb1. While the answer at step Sb1 is given negative "NO", the audio system waits for the user's instruction, and repeats step Sb1.

When the instruction reaches the audio system, the answer at step Sb1 is changed to affirmative "YES", and the audio system reads out the audio identification code AID and transmission rate code TRD from the MIDI file mf in the magnetic disc 130b as by step Sb2. The audio system identifies the audio file af to be accessed with the audio identification code AID, and adjusts the clock signal CL1 to the proper frequency.

The audio system synchronously reads out and transfers the audio music data codes and event codes from the audio file af and MIDI file mf to the composite apparatus 100 for the ensemble as by step Sb3 until the end of the audio/MIDI files af/mf.

Modifications

As will be understood, the audio system controls the data read-out and data transmission with the clock signal CL1 so that the plural parts are reproduced in good ensemble.

It is possible to arrange plural audio files to be synchronously reproduced in the hard disc drive 140. This feature is desirable for the user, because the he or she records his or her performances in the corresponding MIDI files without changing the compact disc 120b. Moreover, the hard disc drive 140 is shorter in seek time than the optical disc driver 120a so that the user records his or her performance without a long waiting time.

Although particular embodiments of the present invention have been shown and described, it will be apparent to those skilled in the art that various changes and modifications may be made without departing from the spirit and scope of the present invention.

For example, the digital signal processor 150 may count down the clock pulses so as to intermittently supply the event codes to the playback controller 170 and tone generator for ensemble 160. In this instance, the magnetic disc controller/driver 130a successively supplies the event codes and duration data codes to the controller 110a.

The controller 110a may determine the data read-out speed during the transmission of an audio file from the compact disc 120b to the hard disc drive 140. The audio data codes are grouped in a series of frames, and the synchronous pattern is stored in the head portion of each frame. While the frames are being transferred to the hard disc drive 140, the controller 10 presumes the data read-out speed and, accordingly, data transmission rate on the basis of a time period consumed in the transmission of the synchronous pattern.

In another audio system according to the present invention, the MIDI file mf may be created in the magnetic disc of the hard disc drive 140.

In yet another audio system according to the present invention, more than one MIDI file and/or more than audio file may be created in the hard disc drive 140 for more than two parts of a piece of music.

In still another audio system according to the present invention, a buffer memory may be connected between the optical disc driver 120a and the controller 110a. In this instance, the audio music data codes are temporarily stored in the buffer memory, and, thereafter, are transferred from the buffer memory to the controller 110a synchronously with the clock signal CL1. The data source 120 includes the compact disc 120b, optical disc driver 120a and buffer memory, and the hard disc drive 140 may be eliminated from the audio system.

If the optical disc driver is directly responsive to the clock signal CL1, the audio music data codes are directly supplied to the controller 110a.

Any sort of data sources is available for the audio system according to the present invention. Semiconductor memories and magnetic tape cassettes may be used as the data source, and the MIDI music data codes and/or audio music data codes may be transferred from a provider through a public or private communication network. The magnetic disc 130b may be a floppy disc.

The audio systems according to the present invention may reproduce pieces of music in ensemble. The plural parts may be corresponding to the pieces of music. Otherwise, one of the pieces of music and another piece of music may be a melody and beat sound.

There are various standards for defining music data. The standards of Red Book and the MIDI standards are mere examples of the standards. For this reason, the MIDI file mf and audio file af do not set any limit on the data formats available for the audio system according to the present invention.

The composite apparatus 100 may be replaced with any sort of sound source in so far as the sound source is responsive to more than one audio signal for producing tones. An example of such sort of sound source is a stereophonic system, and another example is a personal computer system. Another sort of musical instrument such as an electric keyboard, electric stringed instrument and electronic wind instrument may form a part of the composite apparatus.

In yet another audio system, the clock generator 112 may be incorporated in each of the data sources 130/140. In this instance, the ensemble controller supplies a control signal representative of a target frequency and timing for making the clock signals synchronous with each other.

In still another audio system according to the present invention, the solenoid-operated actuators may be replaced with another sort of actuators such as, for example, pneumatic actuators, hydraulic actuators or piezoelectric actuators.

Relation Between claims and Embodiments

In the embodiment shown in FIG. 1, the hard disc drive 140 and magnetic disc controller/driver 130 serve as a first data source and a second data source, respectively, and the set of audio music data codes and set of MIDI music data codes are corresponding to a set of first music data codes and a set of second music data codes, respectively. However, the hard disc drive 140, magnetic disc controller/driver 130, set of audio music data codes and set of MIDI music data codes do not set any limit on the first data source, second data source, set of first music data codes and set of second music data codes as described hereinbefore in conjunction with the modifications. The magnetic disc of the hard disc drive 140 and magnetic disc 130b offer a first memory space and a second memory space, respectively.

The composite apparatus serves as a data-to-sound converter, and the electric tones and electronic piano tones/ acoustic piano tones are corresponding to a first sort of sound and a second sort of sound, respectively. It is clear from the above description that the electric tones and electronic piano tones/acoustic piano tones do not set any limit on the technical scope of the present invention. Beat sound and/or natural sound may serve as the first sort of sound and/or second sort of sound.

The clock signal CL1 serves as a control signal. In case where the data sources have respective clock generators, a target frequency and synchronous timing may be indicated by the control signal. The clock generator 112 is a sort of variable frequency clock generator.

The audio identification code AID and MIDI identification code MID serve as a first identification code and a second identification code, respectively. The term "audio" and "MIDI" merely make those identification codes distinguishable from each other. Other terms are available for those identification codes. The transmission rate code TRD is corresponding to a control data code.

The keyboard 174a and pedals 174e serve as manipulators, and sensor array 176 is corresponding to a music data generator. In case where the data-to-sound generator is implemented by a personal computer system, a computer keyboard serves as the manipulators.

What is claimed is:

1. An audio system for reproducing a piece of music in ensemble with another piece of music, comprising:

a first data source having a first memory space for storing a set of first music data codes representative of said piece of music, and responsive to a control signal representative of a data transmission rate for transferring said first music data codes from said first memory space;

a second data source having a second memory space for storing a set of second music data codes representative of said another piece of music and different in format from said set of first music data codes, and responsive to said control signal for transferring said second music data codes from said second memory space;

a data-to-sound converter for producing a first sort of sound and a second sort of sound on the basis of said first music data codes and said second music data codes, respectively; and an ensemble controller connected to said first data source, said second data source and said data-to-sound converter, having a data processing capability, and supplying said control signal to said first data source and said second data source through a data processing for equalizing a first data transmission rate for said set of first music data codes with a second data transmission rate for said set of second music data codes.

2. The audio system as set forth in claim 1, in which said control signal is a clock signal having a frequency representative of said first and second data transmission rates.

3. The audio system as set forth in claim 2, in which said clock signal is output from a variable frequency clock generator.

4. The audio system as set forth in claim 2, in which said set of first music data codes includes audio data codes representative of momentary discrete values of an analog audio signal and time data codes representative of a lapse of time and mixed with said data codes, and said first data source successively reads out said audio data codes and said time data codes from said first memory space in response to said clock signal for transmitting said set of first music data codes to said ensemble controller.

5. The audio system as set forth in claim 2, in which said set of second music data codes includes event codes representative of note events and duration data code each representative of one of said note events and the next note event, and said second data source clocks the time period between said one of said note events and said next note event by using said clock signal.

6. The audio system as set forth in claim 2, in which each of said first and second memory spaces is created in a memory device selected from the group consisting of a magnetic disc, an optical disc, a magnetic tape and semiconductor memories.

7. The audio system as set forth in claim 2, in which said set of first music data codes includes audio data codes representative of momentary discrete values of an analog audio signal and time data codes representative of a lapse of time and mixed with said data codes, and in which said set of second music data codes includes event codes representative of note events and duration data code each representative of one of said note events and the next note event, wherein said first data source successively reads out said audio data codes and said time data codes from said first memory space for in response to said clock signal for transmitting said set of first music data codes to said ensemble controller, and said second data source clocks the time period between said one of said note events and said next note event by using said clock signal.

8. The audio system as set forth in claim 7, in which each of said first and second data sources have said first and second memory spaces each created in a memory device selected from the group consisting of a magnetic disc, an optical disc, a magnetic tape and semiconductor memories.

9. The audio system as set forth in claim 1, in which a first identification code and a second identification code are respectively assigned to said set of first music data codes and said second set of music data codes, and said first identification code and said second identification code are selectively stored in said first memory space and said second memory space so as to correlate said set of first music data codes and said set of second music data codes with one another.

10. The audio system as set forth in claim 9, in which a control data code representative of an attribute of said control signal is further stored in at least one of said first and second memory spaces.

11. The audio system as set forth in claim 10, in which said attribute is a frequency of said control signal.

12. The audio system as set forth in claim 1, in which said data-to-sound converter includes a sound system for converting a first analog audio signal produced on the basis of said set of first music data codes to first tones of said first sort of sound and a second analog audio signal produced on the basis of said set of second music data codes to second tones of said second sort of sound.

13. The audio system as set forth in claim 1, in which said data-to-sound converter includes a tone generator for converting event codes representative of note events and incorporated in said set of second music data codes to tones of said second sort of sound.

14. The audio system as set forth in claim 1, in which said data-to-sound converter includes a controller for producing a driving signal on the basis of event codes representative of note events and incorporated in said set of second music data codes, an acoustic musical instrument and actuators responsive to said driving signal for generating acoustic tones of said second sort of sound from said acoustic musical instrument.

15. The audio system as set forth in claim 14, in which said acoustic musical instrument is a piano.

16. The audio system as set forth in claim 1, in which said data-to-sound converter includes a sound system for converting a first analog audio signal produced on the basis of said set of first music data codes to first tones of said first sort of sound, a controller for producing a driving signal on the basis of event codes representative of note events and incorporated in said set of second music data codes, an acoustic musical instrument and actuators responsive to said driving signal for generating acoustic tones of said second sort of sound from said acoustic musical instrument.

17. The audio system as set forth in claim 16, in which said data-to-sound converter further includes a tone generator for converting said event codes to electronic tones of said second sort of sound.

18. The audio system as set forth in claim 16, in which said acoustic musical instrument is a piano.

19. The audio system as set forth in claim 1, further comprising manipulators selectively manipulated by a user for identifying tones of said second sort of sound to be produced with the manipulators, and a music data generator monitoring said manipulators and supplying detecting signals representative of said tones of said second sort to said ensemble controller, wherein said ensemble controller produces said set of second music data codes on the basis of said detecting signals through another data processing for storing said set of second music data codes in said second memory space.

20. The audio system as set forth in claim 19, in which said user selectively manipulates said manipulators under the condition that said ensemble controller makes said first data source to read out said set of first music data codes in response to said control signal for producing said first sort of sound from said data-to-sound converter.

21. The audio system as set forth in claim 20, in which said ensemble controller, stores a control data code representative of an attribute of said control signal in said second memory space in association with said set of second music data codes.

22. The audio system as set forth in claim 21, in which said ensemble controller further stores a first identification code representative of said set of second music data codes and a second identification code representative of said set of first music data codes in said second memory space for correlating said set of first music data codes and said set of second music data codes with each other.

* * * * *